Sept. 25, 1962 W. H. DRAKE 3,055,608
CONE HOLDERS
Filed April 28, 1961 2 Sheets-Sheet 1
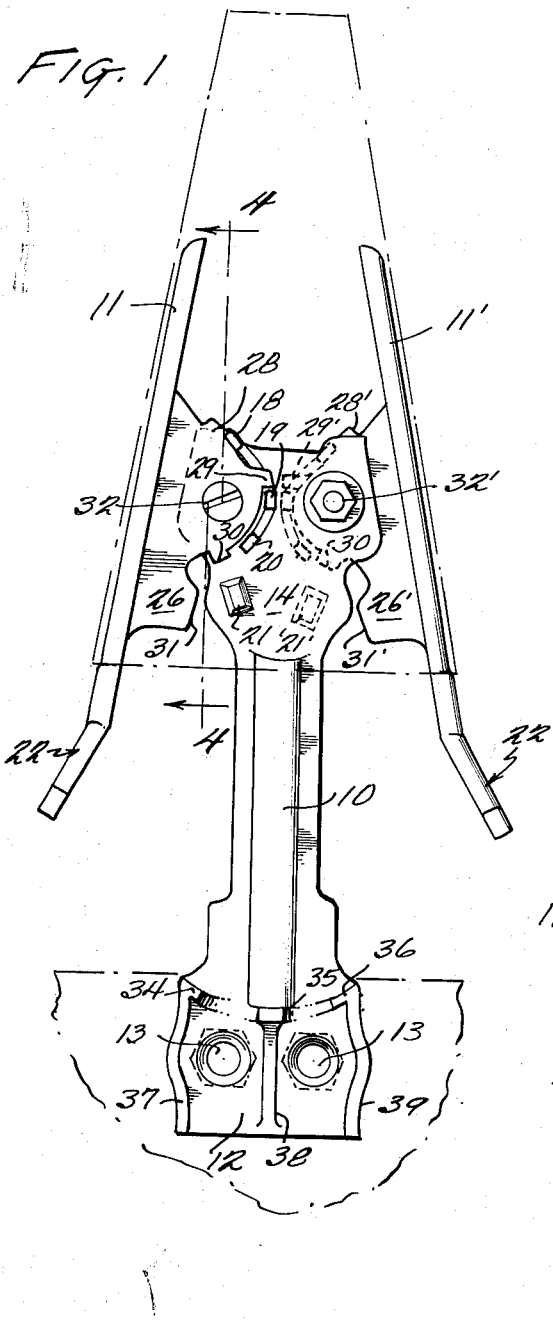
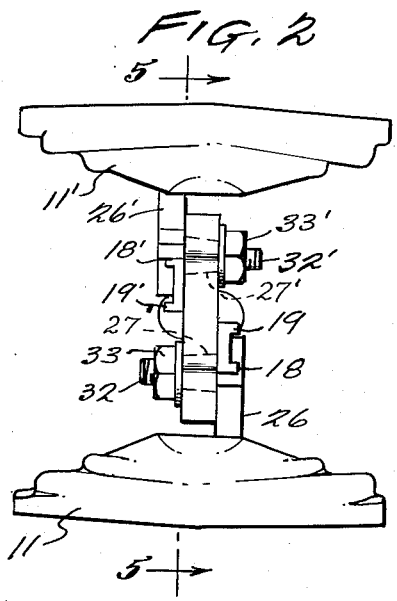
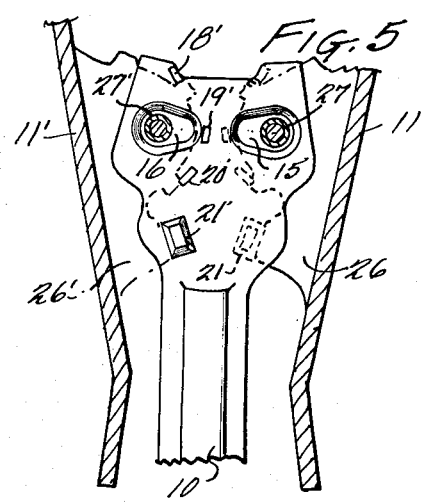
INVENTOR
WILLIAM H. DRAKE
BY Adams & Bush
ATTORNEYS Sept. 25, 1962
W. H. DRAKE
3,055,608
CONE HOLDERS
Filed April 28, 1961
2 Sheets-Sheet 2
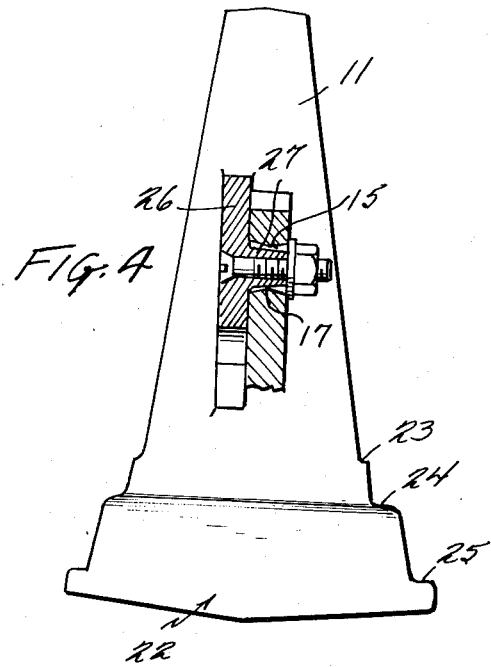
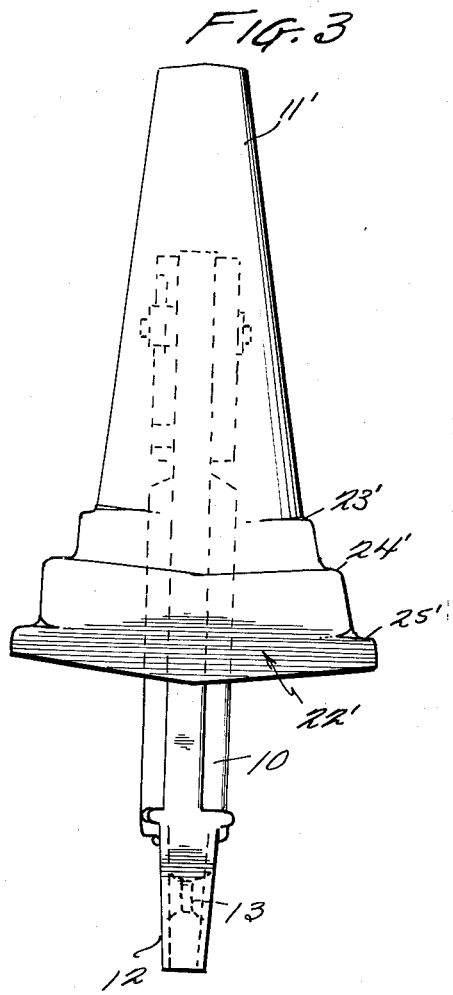
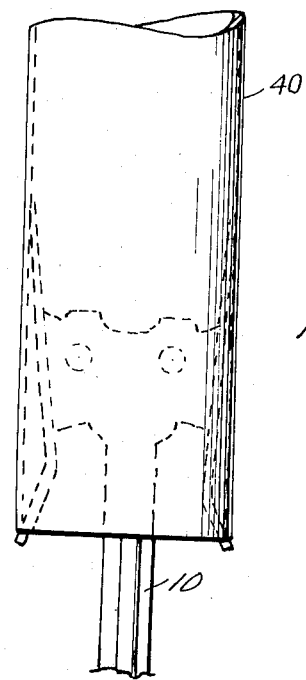
INVENTOR
WILLIAM H. DRAKE
BY
*Adams & Bush*
ATTORNEYS

United States Patent Office 3,055,608
Patented Sept. 25, 1962

3,055,608
CONE HOLDERS
William H. Drake, P.O. Box 2105, Rome, Ga.
Filed Apr. 28, 1961, Ser. No. 106,254
5 Claims. (Cl. 242—129.7)

This invention relates to cone holders for use on creels, winding machines, or other textile apparatus and has more particular reference to a cone holder for supporting cones of yarn, thread, and the like.

One object of the present invention is to provide a novel and improved cone holder which will automatically adjust itself to various sizes and types of cones.

Another object of the present invention is to provide a cone holder, as characterized above, which is adapted to be mounted on the present types of textile apparatus.

Another object of the present invention is to provide a cone holder, as characterized above, which will firmly hold a cone in operative position so that the cone can be easily and quickly applied or removed from the holder.

A further object of the invention is to provide a cone holder which is simple and rugged in construction and efficient in carrying out the function for which it is designed.

Other objects and advantages of the invention will appear in the following specification when considered in connection with the accompanying drawings, wherein:

FIG. 1 is a side elevational view of a cone holder constructed in accordance with the present invention;

FIG. 2 is a plan view of the cone holder shown in FIG. 1;

FIG. 3 is an end elevational view of the cone holder shown in FIG. 1;

FIG. 4 is a sectional view on the line 4—4 of FIG. 1;

FIG. 5 is a sectional view on the line 5—5 of FIG. 2; and

FIG. 6 is a side elevational view showing a cylindrical cone mounted on the cone holder.

The present invention provides a novel and improved cone holder adapted for use with various types of textile machines to hold cops or cones of various sizes and types and, in general, comprises a shank or base member adapted to be secured to a creel or other part of a textile machine and having an opposed pair of holder wings pivotally mounted thereon in such a manner that the holder wings automatically adjust to fit the inside of cones of various kinds and sizes, including cylindrical types.

Referring now to the drawings, there is shown, in FIGS. 1, 2 and 3, a cone holder constructed in accordance with the present invention. As there shown, the cone holder comprises a shank 10 having opposed holder wings 11 and 11' pivotally and adjustably mounted on one end portion. The shank 10 is shown as an elongated, preferably cast, aluminum member having strengthening ribs on opposite sides and having one enlarged substantially flat end portion 12 provided with means such as bolt holes 13, by which the shank may be attached to the creel or other part of a textile mechanism. The other end portion 14 of the shank is also substantially flat and enlarged and provided with horizontally spaced and aligned holes 15, 16. The holes 15, 16 are oval shaped, with the side walls of their broader ends tapering from both sides of the shank 10 toward the middle, as indicated at 17, in FIG. 4. In addition, the longitudinal axes extend downwardly and outwardly in opposite directions at an angle of about 3° from the horizontal.

On one surface of the end portion 14 of the shank 10, three upwardly projecting lugs, 18, 19 and 20 are arranged in generally arc-shaped formation about the elongated hole 15 to form stop members. On this same surface is another upstanding lug 21 forming a stop member, all for a purpose hereinafter to be explained. The opposite surface of the end portion 14 has upstanding lugs 18', 19', 20' arranged in a similar manner about the hole 16. A lug 21' also extends upwardly from this surface.

The holder wings 11 and 11' are generally similar in construction and are triangular in outline with their outer surfaces curved and their lower ends or base portions 22, 22' flared outwardly and stepped, as shown in FIGS. 1 and 3, to form ledges 23, 24, 25 and 23', 24' and 25' for a purpose hereinafter to be explained.

Both holder wings 11 and 11' have inwardly extending lateral flanges 26, 26', respectively, which extend normal thereto. The two lateral flanges 26, 26' project inwardly toward each other from adjacent opposite side edges of the wings 11, 11', as shown in FIGS. 1 and 2.

The flanges 26, 26' have laterally projecting bosses 27, 27', respectively, which extend normal thereto and are mounted in the elongated slots 15 and 16, respectively, formed in the upper end portion 14 of the shank 10. The outer peripheries of the two flanges 26, 26', are provided with laterally spaced lugs 28, 29, 30, 31, and 28', 29', 30' and 31', respectively, which act as stops and are positioned to engage the stops 18, 19, 20, 21, and 18', 19', 20', 21', carried by the shank member 10, for a purpose hereinafter to be described.

The holder wings 11, 11' are pivotally mounted on opposite sides of the shank member 10 by bolts 32, 32' passing through the bosses 27, 27' and secured by nut and washer combinations 33, 33' in the holes 15 and 16 formed in the shank 10.

While the cone holder of the present invention can be employed on various types of textile machinery, it is particularly designed for use on creels of tufting textile machinery for the purpose of positioning or holding the yarn in correct position on the creel while the yarn is being consumed off the cone. For this purpose, upstanding locating bosses 34, 35 and 36 are formed on the end portion 12 of the shank 10 above the bolt holes 13. This permits placing the bosses 34 and 35 against the straight edge of angle iron or flat iron on the creel, then the shank is bolted to the creel by a bolt passing through the bolt hole 13 centered at an angle between the bosses 34, 35. This holds the cone holder at a slight angle. By using the bosses 35, 36 and the bolt hole 13 centered at an angle therebetween the cone holder may be mounted at a slight angle in the opposite direction. Three raised ribs 37, 38, 39 may be provided for a horizontal installation.

The manner in which the cone holder operates to hold cones of various sizes and types is believed apparent.

When a small cone is used the inner surface of the cone engages the outer surface of the holder wings 11, 11', thus bringing stops 28, 29 on the holder wing 11 into contact with stops 18 and 19, respectively, on the shank 10, and stops 28', 29' on the holder wing 11' into contact with stops 18' and 19', respectively, on the opposite surface of shank 10. Contact of these stops raises the cast bosses 27, 27' up and outwardly in the slotted holes 15 and 16, respectively, thereby conforming the holder wings 11, 11' to the proper angle and taper to engage the inner surface of the small cone. Stops 29, 19 and 29', 19' form a locking position to hold the cone of yarn in line with the shank 10.

When the small cone is removed and a larger one installed, the cast bosses 27, 27' will move down in the slotted holes 15, 16, respectively, and stops 30 and 28 on holder wing 11 will come into contact with stops 20 and 18 on the shank 10, and stops 30' and 28' on holder wing 11' will come into contact with stops 20' and 18' on the other surface of the shank 10. In this position, the inner surface of the cone engages the holder wings 11, 11'. This will lock the cone holder in a position of less taper to conform with the angle and inside taper of the cone and align the cone on center in line with the shank 10.

When the next size larger cone is used, which has a greater opening on the large end, the large end of the cone will slip over the wider areas of the holder wings 11, 11' and cone to rest securely on the ledges 23, 23' of the holder wings 11, 11', respectively, with the inside narrow part of the cone coming to rest on the narrow ends of the holder wings 11, 11', thus lining the cone up with the center line of the shank 10. In this position, the stops 30 and 28 on holder wing 11 will come into contact with stops 20 and 18 on the shank 10, and stops 30' and 28' on holder wing 11' will come into contact with the stops 20' and 18' on the other surface of the shank 10, thus locking the cone holder in proper position.

When the largest cone 40, as shown in FIG. 6, which is cylindrical, having no taper whatever, is used it will slip over the holder wings 11, 11' and as it passes over the outwardly flared portions of the members 11, 11', which form the ledges 24, 24', it will change the relative positions of the members 11, 11', so that the stops 29, 31 on the wing holder 11 and stops 29', 31' on the wing holder 11' move up as the cast bosses 27, 27' move up in the slotted holes 15 and 16, respectively. This will position the holder wings 11, 11' so that the outwardly flared portions of the holder wings 11, 11' forming the ledges 24, 24', respectively, and the narrow ends of the wing holders 11, 11' conform with the inside of the cylindrical cone and the cone will rest securely on the ledges 25, 25' of the members 11, 11', respectively, stop members 29, 30 on the holder wing 11 engaging stop members 20 and 21, respectively, on the shank 10 and stop members 29', 30', on the holder wing 11' engaging stop members 20' and 21', respectively, on the shank 10, lock the cone in position to line up with the shank 10 for a fixed position while in use.

From the foregoing, it readily will be seen that there has been provided a novel and improved cone holder, particularly adapted for use on creels of tufting textile machines; a cone holder capable of firmly holding cones of various sizes and types in operative position; one on which different sizes and types of cones can be easily and quickly applied or removed.

Obviously, the invention is not restricted to the particular modification thereof shown and described.

What is claimed is:

1. A cone holder for textile machines comprising an elongated shank member having a pair of substantially horizontally aligned openings formed in one end portion with its other end portion adapted for mounting on a creel frame; a pair of opposed holder wings each having a laterally projecting flange extending normal thereto and carrying an apertured boss extending normal to said flange, said holder wings being positioned on opposite sides of said shank member each with its boss pivotally and rectilinearly adjustably mounted in one of said openings in said shank and movable toward and from each other relative to the longitudinal center line of said shank member to permit cones of various sizes and shapes to be placed thereon; and means for locking said holder wings relative to the shank member to firmly grip a cone fitted thereon including cooperating locking members formed on said shank member and said holder wings, the construction and arrangement being such that as the holder wings have moved about their pivots to adjust to fit the interior of the cone placed on the holder, the cooperating locking means will lock the cone in alignment with the longitudinal center line of the shank member.

2. A cone holder, as set forth in claim 1, wherein said holder wings are generally triangular in outline, and have their outer edges at their base portions stepped to form a series of shoulders adapted to form offset stops for the base ends of cones of various sizes which may be mounted on the holder.

3. A cone holder as set forth in claim 1, wherein the openings in which the bosses are pivotally mounted are oval shaped, have their longitudinal axes extending outward and slightly downward in opposite directions, and have the outer side walls of their broader end portions sloping downwardly and inwardly to permit the boss mounted therein to work freely therein.

4. A cone holder as set forth in claim 1, wherein said cooperating locking members formed on said shank member and said holder wings comprise a plurality of upstanding lugs formed on each surface of said shank member with the lugs on each surface arranged generally in the form of an arc around one of the boss receiving openings, and a plurality of laterally projecting and laterally spaced lugs formed on the outer peripheries of the flanges formed on said holder wings.

5. A cone holder as set forth in claim 1, wherein the end portion of said shank member adapted for mounting on a creel frame is provided with laterally spaced and horizontally aligned bolt holes and the opposing surfaces of said shank member above said bolt holes are provided with a plurality of laterally spaced upstanding locating bosses positioned above said bolt holes to permit said holder wings to be mounted in different angular positions on said creel frame.

References Cited in the file of this patent

UNITED STATES PATENTS

| | | |
|---|---|---|
| 2,635,829 | Carroll | Apr. 21, 1953 |
| 2,713,979 | Sigman | July 26, 1955 |
| 3,002,774 | Chapellier | Oct. 3, 1961 |